INVENTORS
ROBERT JAMES KROHL
EDWARD STANLEY WAJDA

BY David E. Lovejoy

AGENT 3,437,890
Patented Apr. 8, 1969

3,437,890

DIFFUSED-EPITAXIAL SCANISTORS

Robert James Krohl, Scotia, and Edward Stanley Wajda, Poughkeepsie, N.Y., assignors to International Business Machines Corporation, Armonk, N.Y., a corporation of New York Filed Nov. 21, 1966, Ser. No. 595,701
Int. Cl. H01l 11/00, 15/00
U.S. Cl. 317—235 16 Claims

ABSTRACT OF THE DISCLOSURE

The present invention relates to low voltage, epitaxially and/or diffusion formed, semiconductor radiation scanning devices. These devices consist of discrete diode-pairs (asymmetrical junctions) connected to a voltage gradient producing layer where each diode-pair includes a radiation sensitive diode and a blocking diode. One diode in each pair is formed by a first relatively thin discrete region deposited onto a relatively thick continuous substrate. The other diode in each pair is formed by a second relatively thin region deposited through openings in an insulating layer onto the first thin region. This epitaxially and/or diffusion produced, thin-layered construction fosters a diode-pair density approaching 1,000 per inch thereby providing a scanner having increased resolution.

CROSS-REFERENCES TO RELATED APPLICATIONS ASSIGNED TO THE SAME ASSIGNEE

Radiation Scanner, Ser. No. 279,531, filing date May 10, 1963, now U.S. Patent No. 3,317,733.

Radiation Scanner, Ser. No. 424,425, filing date Dec. 28, 1964.

Solid State Scanner, Ser. No. 460,233, filing date June 1, 1965.

Two-Dimensional Scanner, Ser. No. 460,081, filing date June 1, 1965.

*Background and objects of the invention*

The above-identified patent application entitled Radiation Scanner, Ser. No. 279,531, filed May 10, 1963, discloses recent advances which have been made in radiation scanners. One device disclosed therein consists of a multiple layered structure including an intermediate layer of one conductivity type positioned between and in continuous contact with two continuous outer layers of the opposite conductivity type. Additionally, there is disclosed therein a fused device in which the intermediate layer is discontinuous being composed of individual bridges of material each fused between two relatively thick continuous outer layers.

This fused device consists of a plurality of diode pairs, that is, each discrete intermediary layer forms one diode with the relatively thick upper layer and another diode with the relatively thick lower layer. At least one of the diodes in each of the diode pairs is radiation sensitive and the other diode, called a blocking diode, is rendered conducting or not by means of a gradient voltage established by a varying current passed through one of the outer layers. The current variation and the resultant voltage gradient variation cause the blocking diodes to be unblocked in a sequential fashion thereby sequentially detecting the presence or absence of incident radiation on the radiation sensitive diodes. The details relating to the general mode of operation of these devices are more fully described in the above-mentioned patent application (Ser. No. 279,531) which details are hereby incorporated by reference.

Although the fused radiation scanner disclosed in the above-mentioned patent application employs discrete central layers, those central layers are constructed by fusing drops of indium metal (called "dots") between two relatively thick outer layers. This method of fabrication and the resultant fused structure limits the "dot" spacing to an approximate minimum of 0.010 inch or in other words to 100 diode-pairs per inch. Although 100 diode-pairs per inch provides adequate resolution for many purposes, it is desirable to produce increased resolution by providing radiation scanners having a density approaching 1,000 discrete diode-pairs per inch. As discussed in the above-mentioned application, the continuous layer devices do not produce the desired increased resolution, but to the contrary, they have poorer resolution because of the dispersion of the incident radiation and the current generated thereby.

Besides the desirability of increasing the number of diode-pairs per inch, it is also desirable to control the thickness of the outer layer associated with each radiation sensitive diode (down to 0.06 mil or smaller) in order to further increase resolution. Resolution is increased when discrete intermediary layers (contrasted with continuous layers) are utilized because there is less dispersion to adjacent diode areas. In the same manner, the reduction of the thickness of the outer layer upon which the radiation is incident also reduces the dispersion and increases the resolution.

While the reduction of the thickness of the outer layer has the beneficial effect of reducing the dispersion or "noise" detected by adjacent diode pairs, it may have the deleterious effect of reducing the sensitivity of the device since the outer layer volume, which is a factor controlling the amount of current produced by the incident light, is also reduced. Therefore, it is desirable to precisely control the thickness of that outer layer so as to obtain the desired sensitivity and so as to maintain uniform sensitivity from diode pair to diode pair.

In accordance with the above background of the invention, it is an object of the present invention to provide improved radiation scanners which are simple, compact, rugged, and long lived, capable of high speed operation, operable at low voltage, and economical to manufacture.

It is another object of this invention to provide a semiconductor radiation scanner having higher resolution.

It is still another object of this invention to fabricate a radiation scanner in which the outer semiconductor layer associated with the discrete radiation sensitive diodes is thinner than heretofore.

It is a further object of this invention to construct a semiconductor radiation scanner having a greater discrete diode-pair density than heretofore possible.

It is a still further object ot this invention to fabricate an improved semiconductor radiation scanner using a novel combination of fabrication steps heretofore well known separately.

An additional object of this invention is to provide an improved semiconductor radiation scanner capable of higher resolution when used in one manner and capable of high sensitivity when used in a second manner.

BRIEF SUMMARY OF THE INVENTION

In accordance with the present invention, a plurality of discrete asymmetrical junction pairs (diode-pairs) are fabricated integrally with a substrate of one semiconductor conductivity type. The substrate has a plurality of closely-spaced (may approach 1,000/in.) discrete, asymmetrical junction forming, intermediary regions along its essentially horizontal upper surface which may be deposited there using semiconductor diffusion and/or epitaxial techniques. On top of the discrete intermediary regions, a thin insulating layer is provided which covers the essentially horizontal surfaces of these discrete regions and any uncovered substrate area except that small openings are provided in the insulating layer. The small openings expose less than the whole surface area of each of the discrete intermediary regions. Through these openings in the insulating layer, material forming an asymmetrical junction is deposited. The material may be either a thin continuous layer or alternatively may be thin discrete regions each forming a junction with one discrete intermediary region.

Since the materials are deposited on the substrate using epitaxial or diffusion techniques the radiation scanners' dimensions (length, width, and depth) can be accurately controlled so that discrete diode densities approaching 1,000 pairs per inch may be achieved. This greater density is much superior to the density obtainable where the intermediary layers are fused between two relatively thick outer layers. Accordingly, the structure of the present invention is capable of much higher resolution while retaining most of the advantages of the fused devices.

The structure of the radiation scanning device has been improved using a combination of manufacturing steps heretofore separately well known in the prior art. Since these steps are widely known and used in the manufacture of other semiconductor devices, they are readily available and thus make the present invention economically attractive. Furthermore, the dimensional control achievable using these methods results in a device having a large field resolution comparable with other radiation scanners such as cathode ray flying spot scanners, orthicon tubes, and vidicon tubes—all of which are more complicated and expensive.

A further feature of the present invention results from having a versatile radiation scanner with one outer layer thin and the substrate layer relatively thick. Such a device has a dual capability. When the device is operated with incident radiation on the thin side, high resolution is achieved. Alternatively with the light incident upon the thick substrate, a high density, high sensitivity device is achieved.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 1*a* depicts the initial substrate.

FIG. 1*b* depicts the addition of an epitaxial intermediary layer to the substrate.

FIG. 1*c* depicts the division of the intermediary layer into discrete regions by means of isolation diffusion.

FIG. 1*d* depicts the position of the insulating layer with the openings therein exposing portions of the discrete intermediary layers beneath.

FIG. 1*e* depicts a front view of the FIG. 1*d* structure with the addition of diffused opposite conductivity material through the insulating layer openings into the intermediary discrete regions.

FIG. 1*f* depicts the resultant device with ohmic contacts added to either end of the substrate and an ohmic contact connecting the diffused upper regions.

FIG. 2*a* depicts a top view of the device.

FIG. 2*b* depicts a front sectional view of the FIG. 2*a* device taken along the plane X–X'.

FIG. 2*c* depicts an isometric view of the device with appropriate sections along the planes X–X' and Y–Y'.

FIG. 3*a* shows a top view and FIG. 3*b* a front view of the device.

DETAILED DESCRIPTION

Combination diffused and epitaxial embodiment

Figure 1A:
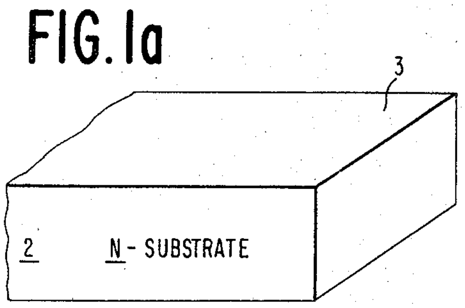
FIGS. 1*a*–*f* depict the various stages of construction of a combination diffused and epitaxial radiation scanner.
Figure 1B:
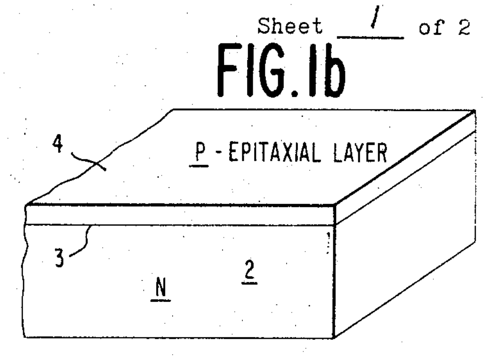
Figure 1C:
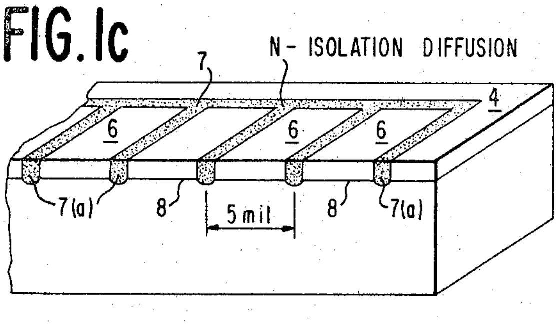
Figure 1D:
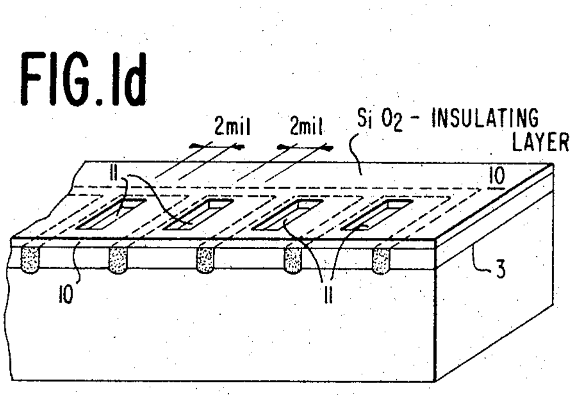
Figure 1E:
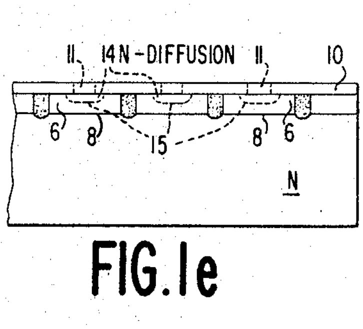
Figure 1F:
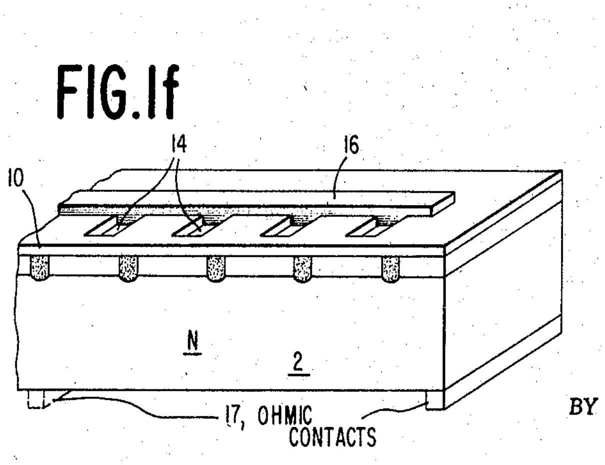

FIG. 1*f* depicts a typical device made in accordance with the present invention as illustrated in steps from FIG. 1*a* through 17*f*.

In FIG. 1*a*, a portion of an elongated substrate of semiconductor N type material 2 is shown. The substrate 2 may have typical dimensions of one-half inch (500 mils) in length, 30 mils in width, and 8 mils in thickness. These dimensions are merely suggested as typical and, of course, the length and width may vary considerably. The thickness while being more critical may also vary over a considerable range such as from a few mils up to 10 or 15 depending upon the wave length of radiation utilized, the configuration utilized, and the resolution and sensitivity desired. A requirement of the invention is that the substrate be relatively thick. For the purposes of this application, a relatively thick substrate will be defined as ranging from a few mils up to 15 mils.

In FIG. 1*b*, an epitaxial P layer 4 is shown on the upper surface 3 of substrate 2. The surface of layer 4 is relatively flat and lies in a plane which is substantially parallel with the upper surface 3 (see FIG. 1*a*) of substrate 2. The thickness of the intermediary layer 4 is relatively thin, e.g., 0.18 mil as shown, but is also variable and may range from 0.1 mil or smaller to several times 0.18 mil.

In FIG. 1*c* the P region 4 is broken into a plurality of relatively thin discrete regions 6 by the isolation region 7. The relatively thin discrete regions 6 form a plurality of discrete asymmetrical semiconductor first junctions 8 with the substrate 2 along its upper surface 3. The isolation region 7 is produced using suitable masking and diffusion techniques well known in the prior art. The diffusion is carried out so that the isolation N material extends through the P layer 4 into the substrate 2. The parallel arm portions 7*a* of the region 7 are spaced according to the diode density desired. If a diode density of 1,000 per inch is desired, the on-center spacing between the arms 7*a* is 0.1 mil. In FIG. 1*c*, the distance is suggested as being about 5 mils yielding a diode density of about 200 per inch. Of course, the spacing is a matter of choice down to a lower limit approaching 0.1 mil.

An $SiO_2$ relatively thin insulating layer 10 is placed on top of the FIG. 1*c* structure as shown in FIG. 1*d*. The layer 10 forms a plane which is substantially parallel with the upper surface 3 of substrate 2. Although $SiO_2$ is preferred, layer 10 may also be $Si_3N_4$ or any other similar insulating material. The thickness of the layer 10 may be varied considerably but is ordinarily about 1,000 angstroms or approximately about 0.004 mil. The openings 11 in the $SiO_2$ insulating layer are about 2 mils wide by about 15 mils long which again will vary considerably depending upon the diode density desired. The openings 11 do not extend to the edges of the flat surfaces of regions 6 but are dimensioned and positioned so as to expose only portions of those surfaces. The openings are not, of course, restricted to rectangles but may be made in any shape.

By means of well known diffusion techniques, N regions 14 are diffused through the openings 11 into the discrete P regions 6 to form the discrete double diode NPN structures desired as shown in FIG. 1*e*. The relatively thin regions 14 form a plurality of asymmetrical semiconductor second junctions 15. Each of the respective second junctions 15 are, by means of the common thin region 6, paired to the respective first junctions 8. The regions 14 are relatively thin and may be typically 0.06 mil and range from 0.02 mil up to a few tenths of a mil.

In FIG. 1*f* the addition of the ohmic contacts 17 (by any well known technique) to the substrate 2 is shown. Also, an ohmic contact 16 is similarly deposited connecting the N diffusion regions 14. The thickness of the layer 16 may be for example 0.004 mil plus the thickness of the extension through the insulating layer where appropriate. Of course, these dimensions can be varied considerably as will be apparent to those skilled in the art.

In operation, the device of FIG. 1*f* would be connected in a manner consistent with the principles in the abovementioned patent application (Ser. No. 279,531). The device could be connected with the light incident on the substrate 2 or alternatively with the light incident upon the N regions 14. Because the N regions 14 are very thin and may be closely spaced, the device achieves the objective of high resolution while at the same time providing a device which, when used with light incident on the substrate, yields high sensitivity.

Double diffusion embodiment

Figure 2A:
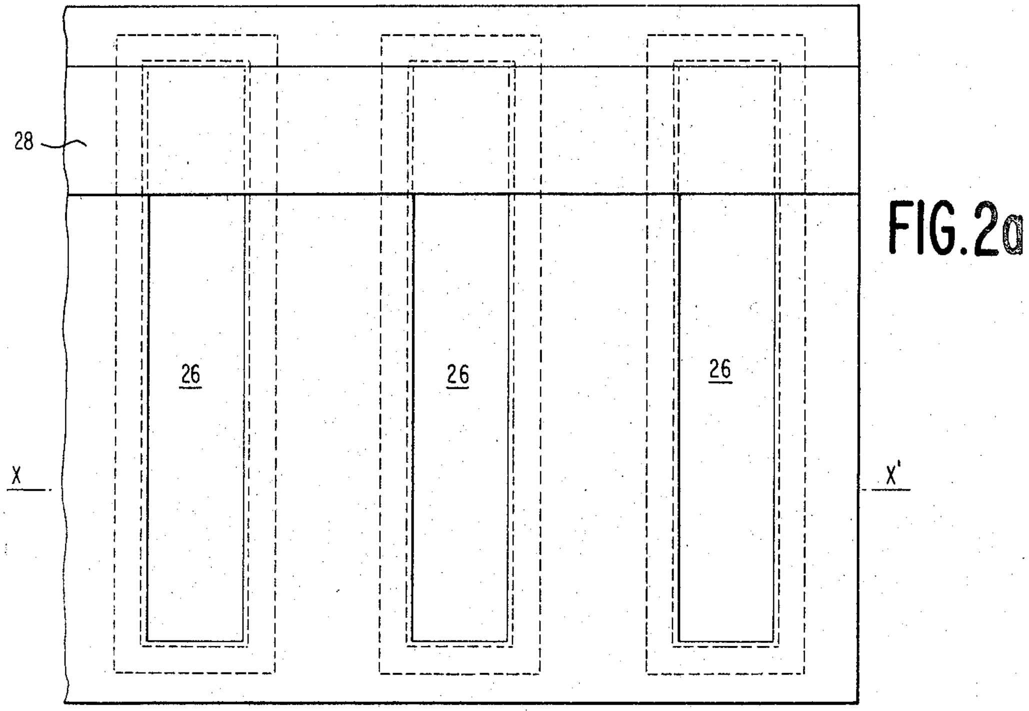
FIGS. 2*a*–2*c* depict a double diffused embodiment of the invention.
Figure 2B:
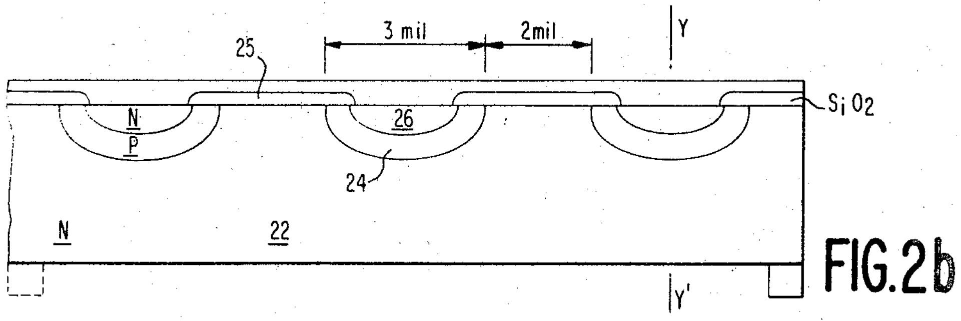
Figure 2C:
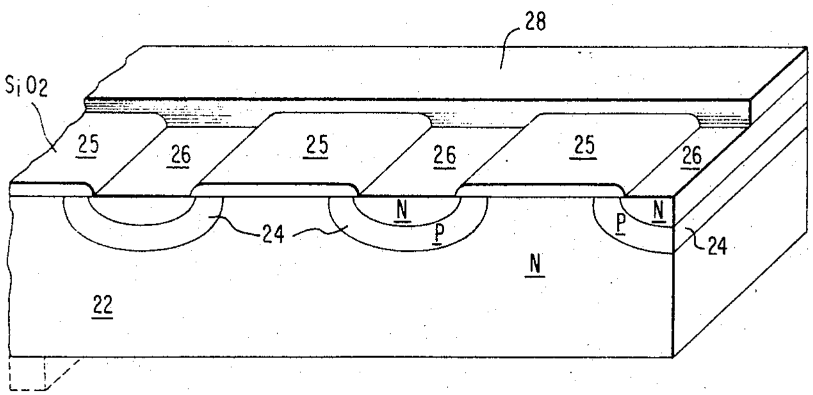

FIGS. 2*a*, 2*b*, and 2*c* depict portions of a radiation scanner in accordance with the present invention made using a double diffusion technique.

In FIG. 2*c*, the substrate N region 22 is shown at a thickness of about 3 mils. Within the substrate 22 are diffused P regions 24 extending to a depth of about 0.18 mil. Covering portions of the P regions 24 and exposed areas of the substrate 22 are insulating layers 25 of an approximate thickness of 0.004 mil. Extending down through the insulating layer regions 25 into the P regions 24 are the thin N regions 26 which complete the desired NPN diode-pair structure.

FIG. 2*c* is, of course, an isometric view taken along the Y–Y′ plane of the FIG. 2*b* drawing which in turn is a sectional view along the X–X′ plane of the FIG. 2*a* top view of the drawing. As indicated in FIG. 2*b* the width of the P region 24 is about 3 mils and the spacing between P regions is about 2 mils so that the spacing from diode to diode is about 5 mils yielding a diode-pair density of about 200 per inch. Of course, as discussed with reference to the diffused-epitaxial embodiment all the dimensions and materials may be varied. The same ranges and materials that were discussed with reference to that embodiment are also applicable with reference to the double diffused embodiment.

It should also be noted that although the N regions 26 are made relatively thin, they are made comparatively very long as is apparent in FIG. 2*a* where it appears that they may be typically exposed for a length of approximately 10 mils, the remainder of N regions 26 being covered by the terminal bus 28. This relatively long length helps to compensate for the reduction in sensitivity caused by making the layer very thin.

Other embodiments and variations

Figure 3A:
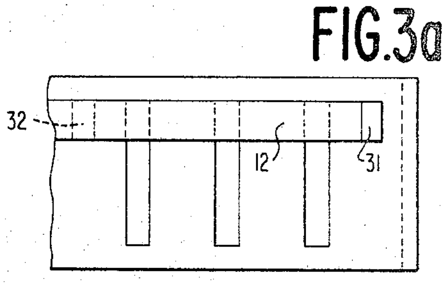
FIGS. 3*a* and 3*b* depict a double epitaxial embodiment of the invention.
Figure 3B:
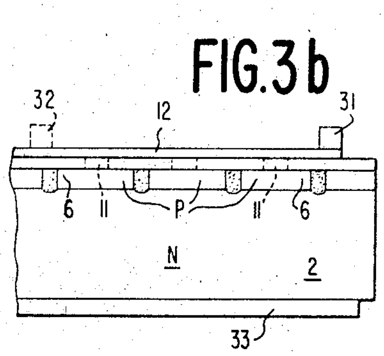

As will be apparent to those skilled in the art, variations in the diffusion and epitaxial techniques can be made. For example, a double epitaxial device could be constructed using the FIG. 1*d* structure as a starting block. By depositing an epitaxial N region 12 through the openings 11 in the $SiO_2$ insulating layer 10 to the P region 6 such a device would be constructed as shown in FIGS. 3*a* and 3*b*. Note that the epitaxial region 12 is a continuous layer and as such may function to produce the voltage gradient necessary for the operation of the device. The gradient is produced when current is passed through the layer 12 by means of the ohmic contacts 31 and 32 (shown dotted to indicate that it would be at the opposite extreme end, not shown). With the gradient produced through contacts 31 and 32, the ohmic contact 33 would be required to run the full length of substrate 2. Of course, the selection of the double contacts on either the top or bottom N layer when both are continuous is purely a matter of choice.

The various views of the drawings will be recognized as being generally sectional views of small portions of the completed devices in order to present the invention more clearly. Naturally, the deposited materials as is suggested in FIG. 2*a* do not necessarily run to the edges of the substrate 22. Furthermore, these devices in normal use would be incapsulated using suitable well known techniques which preserve the optical qualities desired.

The different layers or regions such as 2, 4, and 14 in FIGS 1 and 2 have been described as being of opposite-conductivity type so as to form diode junctions. It will be understood that the differences between the materials of these different layers or regions is only that difference which is required to produce asymmetrically conductive semiconductor junctions. Thus, the layers may be of opposite conductivity type such as P and N type silicon, or may be of the same conductivity type but composed of different molecules such that asymmetrically conductive junctions are produced. Greater differences may also exist. For instance, the different layers may consist of a semiconductor plus a junction-forming metal which is sometimes referred to as a "contact." For the purposes of this invention, however, the term "semiconductor junction" refers to any of the above combinations. While the asymmetry has been explained as being in one direction (e.g., all the devices shown are NPN structures), the symmetry can of course be in the opposite direction by merely reversing the order of materials (e.g., PNP structures).

As has been previously suggested the devices of the present invention may be illuminated from either side. Additionally, it should be noted that the devices are also capable of use with radiation incident simultaneously on both the upper and lower surfaces. Many other variations in use are of course available and will be apparent to those skilled in the art.

While the invention has been particularly shown and described with reference to preferred embodiments thereof it will be understood by those skilled in the art that various changes in form and details may be made therein without departing from the spirit and the scope of the invention.

What is claimed is:

1. A semiconductor radiation scanning device formed of pairs of asymmetrical junctions comprising:

an elongated substrate of a semiconductor first material having an upper surface;

a plurality of relatively thin discrete regions of a second material forming a plurality of discrete asymmetrical semiconductor junctions with said first material along the upper surface;

a relatively thin insulating layer in contact with said discrete regions, said layer including a plurality of openings positioned above and exposing portions of said discrete regions such that the upper surface in close proximity to the discrete regions is totally incapsulated; and a plurality of asymmetrical semiconductor second junctions formed by a relatively thin third material of a junction-forming type only extending through said openings, said third material only contacting said discrete regions whereby each of said second junctions by means of the common discrete region is paired with one of said first junctions.

2. A semiconductor radiation scanning device formed of pairs of asymmetrical junctions comprising:

an elongated substrate of a semiconductor first material having an upper surface;

a plurality of relatively thin discrete regions of a second material forming a plurality of discrete asymmetrical semiconductor first junctions with said first material along the upper surface, said regions having substantially flat surfaces in a plane substantially parallel with said upper surface;

a relatively thin insulating layer in contact with said discrete regions and covering portions of said flat surfaces, said layer including a plurality of openings each positioned above and exposing a portion of one of said flat surfaces whereby said upper surface in close proximity to said regions is totally incapsulated; and a plurality of asymmetrical semiconductor second junctions formed by a relatively thin third material of a junction-forming type only extending through said openings, said third material only contacting said discrete regions whereby each of said second junctions by means of the common discrete region is paired with one of said first junctions.

3. The semiconductor radiation scanning device of claim 2 wherein said discrete regions have an on-center spacing of less than 0.010 inch and greater than 0.001 inch.

4. The device of claim 3 wherein said first and third materials are of semiconductor N type, said second material is of semiconductor P type, and said insulating layer is $SiO_2$.

5. The device of claim 3 wherein said substrate is between 2 mils and 15 mils thick, said discrete regions are between 0.1 mil and 0.54 mil thick, and said third material is between 0.02 mil and 0.04 mil thick.

6. The device of claim 5 wherein said substrate has at each end an ohmic contact attached thereto, and wherein said third material has attached thereto a continuous ohmic contact extending over a plurality of said second junctions.

7. A semiconductor radiation scanning device formed of pairs of asymmetrical junctions comprising:

an elongated substrate of a semiconductor first material having an upper surface;

a plurality of relatively thin discrete regions of a second material forming a plurality of discrete asymmetrical semiconductor first junctions with said first material along the upper surface, said regions having substantially flat surfaces in a plane substantially parallel with said upper surface;

a relatively thin insulating layer in contact with said discrete regions and covering portions of said flat surfaces, said layer including a plurality of openings each positioned above and exposing a portion of one of said flat surfaces whereby said upper surface in close proximity to said regions is totally incapsulated; and a relatively thin layer of third material only extending through said openings, said third material only contacting said discrete regions thereby forming a plurality of asymmetrical semiconductor second junctions therewith whereby each of said second junctions by means of the common discrete region is paired with one of said first junctions.

8. A semiconductor radiation scanning device formed of pairs of asymmetrical junctions comprising:

an elongated substrate of a semiconductor first material having an upper surface and including a lower surface having at each end an ohmic contact attached thereto;

a plurality of relatively thin discrete regions of a second material forming a plurality of discrete asymmetrical semiconductor first junctions with said first material along the upper surface, said regions having substantially flat surfaces in a plane substantially parallel with said upper surface;

a relatively thin insulating layer in contact with said discrete rigions and covering portions of said flat surfaces, said layer including a plurality of openings each positioned above and exposing a portion of one of said flat surfaces whereby said upper surface in close proximity to said regions is totally incapsulated;

a plurality of relatively thin discrete layers of third material each extending through one of said openings and contacting one of said discrete regions thereby forming a plurality of asymmetrical semiconductor second junctions whereby each of said junctions by means of the common discrete regions is paired with one of said first junctions; and an ohmic contact connecting each of said discrete layers.

9. A semiconductor radiation scanning device formed of pairs of asymmetrical junctions comprising:

an elongated substrate of a semiconductor first material having an upper surface;

a plurality of relatively thin discrete regions of a second material forming a plurality of discrete asymmetrical semiconductor junctions with said first material along the upper surface;

a relatively thin insulating layer in contact with said discrete regions, said layer including a plurality of openings positioned above and exposing portions of said discrete regions such that the upper surface in close proximity to the discrete regions is totally incapsulated; and a plurality of asymmetrical semiconductor second junctions formed by a relatively thin third material of a junction forming type only extending through said openings and contacting said discrete regions upon an area less than that area of said discrete regions exposed through said relatively thin insulating layer, whereby each of said second junctions by means of a common discrete region is paired with one of said first junctions.

10. A semiconductor radiation scanning device formed of pairs of asymmetrical junctions comprising:

an elongated substrate of a semiconductor first material having an upper surface;

a plurality of relatively thin discrete regions of a second material forming a plurality of discrete asymmetrical semiconductor first junctions with said first material along the upper surface, said regions having substantially flat surfaces in a plane substantially parallel with said upper surface;

a relatively thin insulating layer in contact with said discrete regions and covering portions of said flat surfaces, said layer including a plurality of openings each positioned above and exposing a portion of one of said flat surfaces whereby said upper surface in close proximity to said regions is totally incapsulated; and a plurality of asymmetrical semiconductor second junctions formed by a relatively thin third material of a junction-forming type only extending through said openings contacting said discrete regions upon an area less than that area of said discrete regions exposed through said relatively thin insulating layer, whereby each of said second junctions by means of the common discrete region is paired with one of said first junctions.

11. The semiconductor radiation scanning device of claim 10 wherein said discrete regions have an on-center spacing of less than 0.010 inch and greater than 0.001 inch.

12. The device of claim 10 wherein said first and third materials are of semiconductor N-type, said second material is of semiconductor P-type, and said insulating layer is $SiO_2$.

13. The device of claim 10 wherein said substrate is between 2 mils and 15 mils thick, said discrete regions are between 0.1 mil and 0.54 mil thick, and said third material is between 0.02 mil and 0.4 mil thick.

14. The device of claim 13 wherein said substrate has at each end an ohmic contact attached thereto, and wherein said third material has attached thereto a continuous ohmic contact extending over a plurality of said second junctions.

15. A semiconductor radiation scanning device formed of pairs of asymmetrical junctions comprising:

an elongated substrate of a semiconductor first material having an upper surface;

a plurality of relatively thin discrete regions of a second material forming a plurality of discrete asymmetrical semiconductor first junctions with said first material along the upper surface, said regions having substantially flat surfaces in a plane substantially parallel with said upper surface;

a relatively thin insulating layer in contact with said discrete regions and covering portions of said flat surfaces, said layer including a plurality of openings each positioned above and exposing a portion of one of said flat surfaces whereby said upper surface in close proximity to said regions is totally incapsulated; and a relatively thin layer of third material only extending through said openings and contacting said discrete regions upon an area less than the area of said discrete regions exposed through said relatively thin insulating layer, thereby forming a plurality of asymmetrical semiconductor second junctions therewith whereby each of said second junctions by means of the common discrete region is paired with one of said first junctions.

16. A semiconductor radiation scanning device formed of pairs of asymmetrical junctions comprising:

an elongated substrate of a semiconductor first material having an upper surface and including a lower surface having at each end an ohmic contact attached thereto;

a plurality of relatively thin discrete regions of a second material forming a plurality of discrete asymmetrical semiconductor first junctions with said first material along the upper surface, said regions having substantially flat surfaces in a plane substantially parallel with said upper surface;

a relatively thin insulating layer in contact with said discrete regions and covering portions of said flat surfaces, said layer including a plurality of openings each positioned above and exposing a portion of one of said flat surfaces whereby said upper surface in close proximity to said regions is totally incapsulated;

a plurality of relatively thin discrete layers of third material each extending through one of said openings and contacting one of said discrete regions upon an area less than the area of said discrete regions exposed through said relatively thin insulating layer, thereby forming a plurality of asymmetrical semiconductor second junctions whereby each of said junctions by means of the common discrete regions is paired with one of said first junctions; and an ohmic contact connecting each of said discrete layers.

References Cited

UNITED STATES PATENTS

| | | | |
|---|---|---|---|
| 3,189,973 | 6/1965 | Edwards et al. | 317—235 |
| 3,210,548 | 10/1965 | Morrison | 317—235 |
| 3,225,261 | 12/1965 | Wolf | 317—235 |
| 3,274,453 | 9/1966 | Sikina | 317—235 |
| 3,280,391 | 10/1966 | Bittmann et al. | 317—235 |

JOHN W. HUCKERT, *Primary Examiner.*

JERRY D. CRAIG, *Assistant Examiner.*

U.S. Cl. X.R.

250—211